United States Patent Office 3,231,359
Patented Jan. 25, 1966

3,231,359
METHOD OF INHIBITING PLANTS
Peter E. Newallis, Morris Plains, N.J., and John P. Chupp and Joseph W. Baker, Kirkwood, Mo., assignors to Monsanto Company, St. Louis, Mo., a corporation of Delaware
No Drawing. Filed Dec. 30, 1964, Ser. No. 422,416
6 Claims. (Cl. 71—2.3)

This application is a continuation-in-part of copending application Serial No. 860,374, filed December 18, 1959, now abandoned.

This invention relates to a method of pre-emergently inhibiting the growth of plants which comprises treating the plant growing medium with a quantity at least sufficient to inhibit the pre-emergent growth of plants from seeds contained in the plant growing medium of at least one phosphorus-containing compound of the structure

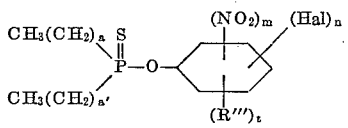

wherein $a$ and $a'$ are numbers from 0 to 1, inclusive, but preferably 0;
wherein Hal is a halogen atom having an atomic number not higher than 35 (i.e. chlorine, bromine or fluorine, but preferably chlorine);
wherein $R'''$ is selected from the group consisting of lower alkyl and halogen-substituted lower alkyl, said halogen substituent being a halogen atom having an atomic number not higher than 35 (i.e. chlorine, bromine or fluorine) the sum total of halogen substituents being not in excess of four, but preferably $R'''$ is lower alkyl;
wherein $m$ is a number from 0 to 2, inclusive;
wherein $n$ is a number from 0 to 3, inclusive;
wherein $t$ is a number from 0 to 2, inclusive;
and wherein the sum total of $m$, $n$ and $t$ is a number from 0 to 3, inclusive.

The phosphorus-containing organic compounds of this invention can be prepared by reacting the appropriate acid halide of the structure

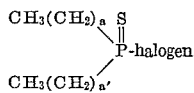

wherein $a$ and $a'$, respectively, have the aforedescribed significance, and wherein the term "halogen" means chlorine or bromine, but preferably chlorine, with a substantially equimolecular proportion of a phenol of the structure

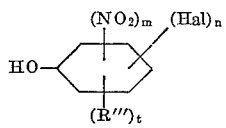

wherein Hal, $R'''$, $m$, $n$, and $t$, respectively have the aforedescribed significance, in an anhydrous medium in the presence of an inert organic liquid or solvent (e.g., acetone, methyl ethyl ketone, carbon tetrachloride, benzene, toluene, xylene, ethyl acetate, isopropyl acetate, or mixtures of two or more inert organic liquids or solvents), and a hydrogen halide (i.e., hydrogen chloride or hydrogen bromide) scavenging agent (e.g., sodium carbonate, potassium carbonate, the tertiary organic amines such as triethylamine, tributylamine, dimethylaniline, pyridine, 1-pipecoline, piperidine, lutidine and the like) in a sufficient amount to absorb the hydrogen halide by-product. The scavenging agent can be added in an equivalent amount at the beginning of the reaction or gradually during the course of the reaction. While a wide range of reaction temperatures can be employed provided the reaction system is fluid (i.e., the system is maintained at a temperature above the freezing point of the system and up to and including the boiling point of the system), it is preferred that a reaction temperature in the range of about 20° C. to about 120° C. be employed. Ordinarily the reaction is carried out at atmospheric pressure, however, pressures above or below atmospheric pressure can be employed where and when desired.

As illustrative of particularly valuable O-aryl dimethylphosphinothioates and O-aryl diethylphosphinothioates of this invention are the following:

O-(phenyl) dimethylphosphinothioate
O-(2-chlorophenyl) dimethylphosphinothioate
O-(3-chlorophenyl) dimethylphosphinothioate
O-(4-chlorophenyl) dimethylphosphinothioate
O-(4-bromophenyl) dimethylphosphinothioate
O-(4-fluorophenyl) dimethylphosphinothioate
O-(2-nitrophenyl) dimethylphosphinothioate
O-(3-nitrophenyl) dimethylphosphinothioate
O-(4-nitrophenyl) dimethylphosphinothioate
O-(2-methylphenyl) dimethylphosphinothioate
O-(3-chloromethylphenyl) dimethylphosphinothioate
O-(4-chloromethylphenyl) dimethylphosphinothioate
O-(4-dichloromethylphenyl) dimethylphosphinothioate
O-(3-trifluoromethylphenyl) dimethylphosphinothioate
O-(4-trifluoromethylphenyl) dimethylphosphinothioate
O-(2,4-dichlorophenyl) dimethylphosphinothioate
O-(3,4-dichlorophenyl) dimethylphosphinothioate
O-(3,5-dichlorophenyl) dimethylphosphinothioate
O-(2-chloro-4-bromophenyl) dimethylphosphinothioate
O-(2-chloro-4-fluorophenyl) dimethylphosphinothioate
O-(2,6-dimethylphenyl) dimethylphosphinothioate
O-(3,4-dimethylphenyl) dimethylphosphinothioate
O-(3,5-dimethylphenyl) dimethylphosphinothioate
O-(3-methyl-4-chlorophenyl) dimethylphosphinothioate
O-(3-methyl-4-bromophenyl) dimethylphosphinothioate
O-(2-chloro-4-nitrophenyl) dimethylphosphinothioate
O-(2-nitro-4-chlorophenyl) dimethylphosphinothioate
O-(3-chloro-4-nitrophenyl) dimethylphosphinothioate
O-(3-methyl-4-nitrophenyl) dimethylphosphinothioate
O-(3-trifluoromethyl-4-nitrophenyl) dimethylphosphinothioate
O-(3-trifluoromethyl-4-methylphenyl) dimethylphosphinothioate
O-(2,4-dinitrophenyl) dimethylphosphinothioate
O-(3,5-dinitrophenyl) dimethylphosphinothioate
O-(2,4,5-trichlorophenyl) dimethylphosphinothioate
O-(3,5-dimethyl-4-chlorophenyl) dimethylphosphinothioate
O-(2,4,5-tribromophenyl) dimethylphosphinothioate
O-(2,6-dibromo-4-nitrophenyl) dimethylphosphinothioate
O-(2,6-dichloro-4-nitrophenyl) dimethylphosphinothioate
O-(2,6-dichloro-4-bromophenyl) dimethylphosphinothioate and the corresponding O-aryl diethylphosphinothioates.

As illustrative of the preparation of the phosphorus-containing compounds of this invention is the following:

Example I

To a suitable reaction vessel equipped with a reflux condenser, thermometer and agitator is charged approximately 15.1 parts by weight (substantially 0.16 mol) of phenol dissolved in approximately 150 parts by weight of toluene. Thereto at room temperature is added slowly and with agitation approximately 8.35 parts by weight (substantially 0.155 mol) of sodium methylate. The mixture is then heated at 60° C. with agitation for 30 minutes. The temperature of the mass is then increased slowly to 110–115° C. to remove the methanol by-product. The residue, i.e., the slurry of sodium phenate in toluene, is then cooled to room temperature. To the residue at room temperature is added slowly and with agitation approximately 19.2 parts by weight (substantially 0.15 mol) of dimethylphosphinothioic chloride. The reaction mass is then heated at 70–80° C. with agitation for approximately 4 hours. The agitator is stopped and the reaction mass is cooled to room temperature and filtered. The filtrate is washed first with a 3 percent aqueous sodium carbonate solution and then with water. The toluene in the so-washed filtrate is then stripped off by heating to 100° C. at 8 mm. pressure. The white crystalline solid remaining is recrystallized from hexane. The recrystallized material is white crystalline O-(phenyl) dimethylphosphinothioate melting at 36–38° C. The yield is 96.5 percent by weight based on the dimethylphosphinothioic chloride charged.

*Analysis.*—Theory: 16.7% phosphorus, 17.2% sulfur. Found: 16.3% phosphorus, 17.9% sulfur.

Example II

To a suitable reaction vessel equipped with a reflux condenser, thermometer and agitator is charged approximately 20.5 parts by weight (substantially 0.16 mol) of 4-chlorophenol dissolved in approximately 150 parts by weight of toluene. Thereto at room temperature is added slowly and with agitation approximately 8.3 parts by weight (substantially 0.155 mol) of sodium methylate. The mixture is then heated with agitation at 60° C. for 30 minutes. The temperature of the mass is then increased slowly to 110° C. to remove the methanol by-product. The residue, i.e., the toluene slurry of sodium 4-chlorophenate, is then cooled to room temperature. To the residue at room temperature is added slowly and with agitation approximately 19.2 parts by weight (substantially 0.15 mol) of dimethylphosphinothioic chloride. The reaction mass is then heated at 70–80° C. with agitation for approximately 4 hours. The agitator is stopped and the reaction mass cooled to room temperature and filtered. The filtrate is washed first with a 3 percent aqueous sodium carbonate solution and then with water. The solvent (i.e., toluene) is then removed by stripping the so-washed filtrate by heating to 100° C. at 5 mm. pressure. The white crystalline solid remaining is O-(4-chlorophenyl) dimethylphosphinothioate, melting at 43–45° C. after recrystallizing from hexane. The yield is quantitative based on the dimethylphosphinothioic chloride charged.

*Analysis.*—Theory: 14.1% P, 14.6% S, 16.2% Cl. Found: 13.8% P, 15.3% S, 16.5% Cl.

Employing the above procedure but replacing dimethylphosphinothioic chloride with an equimolecular amount of diethylphosphinothioic chloride, there is obtained O-(4-chlorophenyl) diethylphosphinothioate, a solid which is soluble in acetone.

Example III

To a suitable reaction vessel equipped with a thermometer, agitator and reflux condenser is charged in the cold (about 10° C.) approximately 100 parts by weight of acetone, approximately 14.5 parts by weight (substantially 0.104 mol) of 4-nitrophenol, approximately 10.8 parts by weight (substantially 0.102 mol) of anhydrous sodium carbonate, and approximately 12.8 parts by weight (substantially 0.10 mol) of dimethylphosphinothioic chloride. The mixture is then heated to the reflux temperature (about 60° C.) and refluxed for about 3 hours. Thereafter the acetone is stripped off at 80° C. and the resulting residue quenched with water and the mass extracted with chloroform. The chloroform solution is then washed first with a 3 percent aqueous sodium carbonate solution and then with water. The chloroform is then stripped off by heating to 90° C. at 5 mm. pressure yielding crude white solid O-(4-nitrophenyl) dimethylphosphinothioate (65 percent yield). This crude solid product upon recrystallization from diethyl ether yielded white crystalline O-(4-nitrophenyl) dimethylphosphinothioate melting at 144–146° C.

*Analysis.*—Theory: 6.1% N, 13.8% S, 13.4% P. Found: 6.0% N, 13.2% S, 12.8% P.

Employing the above procedure but replacing dimethylphosphinothioic chloride with an equimolecular amount of diethylphosphinothioic chloride there is obtained white crystalline O-(4-nitrophenyl) diethylphosphinothioate, which material is soluble in acetone.

Example IV

To a suitable reaction vessel equipped with a reflux condenser, thermometer and agitator is charged approximately 17.3 parts by weight (substantially 0.16 mol) of p-cresol dissolved in approximately 150 parts by weight of toluene. Thereto at room temperature is added slowly and with agitation approximately 8.3 parts by weight (substantially 0.15 mol) of sodium methylate. The mixture is then heated at 60° C. with agitation for 30 minutes. The temperature of the mass is then increased slowly to 110–115° C. to remove the methanol by-product. The residue, i.e., the toluene slurry of sodium 4-methylphenate, is then cooled to room temperature. To the residue at room temperature is added slowly and with agitation approximately 19.2 parts by weight (substantially 0.15 mol) of dimethylphosphinothioic chloride. The reaction mass is then heated at 70–80° C. with agitation for about 4 hours. The agitator is stopped and the reaction mass is cooled to room temperature and filtered. The filtrate is washed first with a 3 percent aqueous sodium carbonate solution and then with water. The solvent (i.e., toluene) in the so-washed filtrate is then stripped off by heating to 100° C. at 5 mm. pressure. The colorless liquid remaining is O-(4-methylphenyl) dimethylphosphinothioate boiling at 103° C. at 0.2 mm. pressure. The yield of distilled material is 70 percent based on the dimethylphosphinothioic chloride charged.

*Analysis.* — Theory: 15.5% P, 16.0% S. Found: 15.1% P, 16.4% S.

Example V

To a suitable reaction vessel equipped with a thermometer and agitator is charged approximately 17.3 parts by weight (substantially 0.16 mol) of o-cresol dissolved in approximately 150 parts by weight of toluene. Thereto at room temperature is added slowly and with agitation approximately 8.3 parts by weight (substantially 0.155 mol) of sodium methylate. The mixture is then heated at 60° C. with agitation for 30 minutes. The temperature of the mass is then increased slowly to 110–115° C. to remove the methanol by-product. The residue, i.e., the toluene slurry of sodium 2-methylphenate, is then cooled to room temperature. To the residue at room temperature is added slowly and with agitation approximately 19.2 parts by weight (substantially 0.15 mol) of dimethylphosphinothioic chloride. The reaction mass is then heated at 70–80° C. with agitation for approximately 4 hours. The agitator is stopped and the reaction mass is cooled to room temperature and filtered. The filtrate is washed first with a 3 percent aqueous sodium carbonate solution and then with water. The solvent (i.e., toluene) in the so-washed filtrate is then stripped off by heating to 100° C. at 8 mm. pressure. The colorless liquid remaining is O-(2-methylphenyl) dimethylphosphinothioate which distills at 99–102° C. at 0.3 mm. pressure. The yield is 93 percent by weight based on the dimethylphosphinothioic chloride charged.

*Analysis.*—Theory: 16.0% S, 15.5% P. Found: 15.9% S, 15.4% P.

Example VI

To a suitable reaction vessel equipped with a thermometer and agitator is charged at room temperature approximately 17.3 parts by weight (substantially 0.1 mol) of 4-bromophenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.1 mol) of dimethylphosphinothioic chloride. The reaction mixture is then heated at 70–80° C. for 3 hours. The reaction mass is then cooled to room temperature, quenched with water and the non-aqueous portion washed with a 3 percent aqueous sodium carbonate solution and then with water. The so-washed organic solution is then stripped of solvent at reduced pressure to give a 96.5 percent yield (based on dimethylphosphinothioic chloride) of O-(4-bromophenyl) dimethylphosphinothioate, a light yellow liquid, which is soluble in acetone and ethyl acetate but insoluble in water.

*Analysis.*—Theory: 30.2% Br, 12.1% S. Found: 30.1% Br, 12.8% S.

Employing the above procedure but replacing 4-bromophenol with an equimolecular amount of 4-fluorophenol there is obtained O-(4-fluorophenyl) dimethylphosphinothioate.

Example VII

To a suitable reaction vessel equipped with a thermometer and agitator is charged at room temperature approximately 16.2 parts by weight (substantially 0.1 mol) of m-trifluoromethylphenol, approximately 100 parts by weight of benzene and sufficient ethyl acetate to provide a homogeneous solution. To this solution is added with agitation approximately 10.1 parts by weight (substantially 0.1 mol) of triethylamine and approximately 12.8 parts by weight (substantially 0.1 mol) of dimethylphosphinothioic chloride. The reaction mixture is then heated at 70–80° C. for 3 hours. The reaction mass is then cooled to room temperature, quenched with water and the non-aqueous portion washed with a 3 percent aqueous sodium carbonate solution and then with water. The so-washed organic solution is then stripped of solvent at reduced pressure to give an 85 percent yield (based on dimethylphosphinothioic chloride) of O-(3-trifluoromethylphenyl) dimethylphosphinothioate, a yellow oil, which is soluble in acetone but insoluble in water.

*Analysis.*—Theory: 12.6% S. Found: 11.7% S.

Example VIII

To a suitable reaction vessel equipped with a reflux condenser, thermometer and agitator is charged approximately 18 parts by weight (substantially 0.147 mol) of 2,6-xylenol dissolved in approximately 250 parts by weight of toluene. Thereto at room temperature is added slowly and with agitation approximately 7.5 parts by weight (substantially 0.14 mol) of sodium methylate. The mixture is then heated at 60° C. with agitation for 30 minutes. The temperature of the mass is then increased slowly to 110–115° C. to remove the methanol by-product. The residue, i.e., the toluene slurry of sodium 2,6-dimethylphenate, is then cooled to room temperature. To the residue at room temperature is added slowly and with agitation approximately 17.2 parts by weight (substantially 0.135 mol) of dimethylphosphinothioic chloride. The reaction mass is then heated at 70–80° C. with agitation for approximately 4 hours. The agitator is stopped and the reaction mass is cooled to room temperature and filtered. The filtrate is washed first with a 3 percent aqueous sodium carbonate solution and then with water. The solvent (i.e., toluene) in the so-washed filtrate is then stripped off by heating to 100° C. at 5 mm. pressure. The white solid remaining is recrystallized from hexane. The recrystallized material is white crystalline O-(2,6-dimethylphenyl) dimethylphosphinothioate melting at 94–96° C. The yield is 90 percent by weight based on the dimethylphosphinothioic chloride charged.

*Analysis.*—Theory: 15.0% S. Found: 15.0% S.

Example IX

To a suitable reaction vessel equipped with a thermometer and agitator is charged at room temperature approximately 16.3 parts by weight (substantially 0.1 mol) of 2,4-dichlorophenol, approximately 150 parts by weight of benzene and sufficient ethyl acetate to provide a homogeneous solution. To this solution is added with agitation approximately 11.1 parts by weight (substantially 0.1 mol) of triethylamine and approximately 12.8 parts by weight (substantially 0.1 mol) of dimethylphosphinothioic chloride. The reaction mixture is then heated at 70–80° C. for 3 hours. The reaction mass is then cooled to room temperature, quenched with water and the non-aqueous portion washed with a 3 percent aqueous sodium carbonate solution and then with water. The so-washed organic solution is then stripped of solvent at reduced pressure to give a 96 percent yield (based on dimethylphosphinothioic chloride) of O-(2,4-dichlorophenyl) dimethylphosphinothioate, a white crystalline solid which on recrystallizing from hexane gave a melting point of 63–65° C.

*Analysis.*—Theory: 12.2% P, 27.8% Cl. Found: 12.0% P, 27.7% Cl.

Employing the above procedure but replacing dimethylphosphinothioic chloride with an equimolecular amount of diethylphosphinothioic chloride there is obtained O-(2,4-dichlorophenyl) diethylphosphinothioate which product is solube in acetone but insoluble in water.

Example X

To a suitable reaction vessel equipped with a thermometer and agitator is charged at room temperature approximately 16.3 parts by weight (substantially 0.1 mol) of 3,4-dichlorophenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.1 mol) of dimethylphosphinothioic chloride. The reaction mixture is then heated at 70–80° C. for 3 hours. The reaction mass is then cooled to room temperature, quenched with water and the non-aqueous portion washed with a 3 percent aqueous sodium carbonate solution and then with water. The so-washed organic solution is then stripped of solvent at reduced pressure to give a 93 percent yield (based on dimethylphosphinothioic chloride) of O-(3,4-dichlorophenyl) dimethylphosphinothioate, a yellow oily liquid, which is soluble in acetone but insoluble in water.

*Analysis.*—Theory: 27.8% Cl, 12.5% S. Found: 28.4% Cl, 13.0% S.

Employing the above procedure but replacing dimethylphosphinothioic chloride with an equimolecular amount of diethylphosphinothioic chloride there is obtained O-(3,4-dichlorophenyl) diethylphosphinothioate which product is soluble in acetone and insoluble in water.

Example XI

To a suitable reaction vessel equipped with a thermometer and agitator is charged at room temperature approximately 12.2 parts by weight (substantially 0.1 mol) of 3,4-xylenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.1 mol) of dimethylphosphinothioic chloride. The reaction mass is then heated at 70–80° C. for 3 hours. The reaction mass is then cooled to room temperature, quenched with water and the non-aqueous portion washed with a 3 percent aqueous sodium carbonate solution and then with water. The so-washed organic solution is then stripped of solvent at reduced pressure to give a 97.5 percent yield (based on dimethylphosphinothioic chloride) of O-(3,4-dimethylphenyl) dimethylphosphinothioate, which on recrystallization from ether gave white crystals, M.P. 50–51° C.

*Analysis.*—Theory: 14.5% P, 15.0% S. Found: 14.8% P, 15.1% S.

Example XII

To a suitable reaction vessel equipped with a thermometer and agitator is charged at room temperature approximately 12.2 parts by weight (substantially 0.1 mol) of 3,5-xylenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.10 mol) of dimethylphosphinothioic chloride. The reaction mixture is then heated at 70–80° C. for 3 hours. The reaction mass is then cooled to room temperature, quenched with water and the non-aqueous portion washed with a 3 percent aqueous sodium carbonate solution and then with water. The so-washed organic solution is then stripped of solvent at reduced pressure to give a 92 percent yield (based on dimethylphosphinothioic chloride) of O-(3,5-dimethylphenyl) dimethylphosphinothioate, a white solid melting at 55–56° C.

Example XIII

To a suitable reaction vessel equipped with a thermometer, agitator and reflux condenser is charged in the cold (about 20° C.) approximately 100 parts by weight of acetone, approximately 17.6 parts by weight (substantially 0.102 mol) of 2-chloro-4-nitrophenol, approximately 10.8 parts by weight (substantially 0.102 mol) of anhydrous sodium carbonate, and approximately 12.8 parts by weight (substantially 0.10 mol) of dimethylphosphinothioic chloride. The mixture is then heated to the reflux temperature (about 60° C.) and refluxed for about 3 hours. Thereafter the acetone is stripped off at 80° C. and the resulting residue quenched with water and the mass extracted with chloroform. The chloroform solution is then washed first with a 3 percent aqueous sodium carbonate solution and then with water. The chloroform is then stripped off by heating to 90° C. at 5 mm. pressure yielding crude O-(2-chloro-4-nitrophenyl) dimethylphosphinothioate, a tan colored solid product which upon recrystallization from diethyl ether yielded tan crystalline O - (2 - chloro-4-nitrophenyl) dimethylphosphinothioate melting at 100–101° C. This solid is soluble in chloroform and acetone but insoluble in water.

*Analysis.*—Theory: 13.4% Cl, 12.1% S, 11.7% P. Found: 13.6% Cl. 12.2% S, 11.3% P.

Employing the above procedure but replacing dimethylphosphinothioic chloride with an equimolecular amount of diethylphosphinothioic chloride, there is obtained solid O - (2 - chloro - 4 - nitrophenyl) diethylphosphinothioate which is soluble in acetone but insoluble in water.

Example XIV

To a suitable reaction vessel equipped with a thermometer and agitator is charged at room temperature approximately 20.7 parts by weight (substantially 0.10 mol) of 4-nitro-3-fluoromethylphenol, approximately 90 parts by weight of benzene and sufficient ethyl acetate to provide a homogeneous solution. To this solution is added with agitation approximately 10.1 parts by weight (substantially 0.10 mol) of triethylamine and approximately 12.8 parts by weight (substantially 0.10 mol) of dimethylphosphinothioic chloride. The reaction mixture is then heated at 60–80° C. for 4 hours. The reaction mass is then cooled to room temperature, quenched with water and the non-aqueous portion washed with a 3 percent aqueous sodium carbonate solution and then with water. The so-washed organic solution is then stripped of solvent at reduced pressure to give an 81 percent yield (based on dimethylphosphinothioic chloride) of O - (3 - trifluoromethyl - 4 - nitrophenyl) dimethylphosphinothioate, an amber oily liquid, which is soluble in both acetone and benzene but insoluble in water.

*Analysis.*—Theory: 4.68% N. Found: 4.66% N.

Employing the above procedure but replacing dimethylphosphinothioic chloride with an equimolecular amount of diethylphosphinothioic chloride there is obtained O - (3 - trifluoromethyl - 4 - nitrophenyl) diethylphosphinothioate.

Example XV

To a suitable reaction vessel equipped with a thermometer and agitator is charged at room temperature approximately 14.3 parts by weight (substantially 0.10 mol) of 4-chloro-3-methylphenol, approximately 150 parts by weight of benzene and sufficient ethyl acetate to provide a homogeneous solution. To this solution is added with agitation approximately 10.1 parts by weight (substantially 0.1 mol) of triethylamine and approximately 12.8 parts by weight (substantially 0.10 mol) of dimethylphosphinothioic chloride. The reaction mixture is then heated at 70–80° C. for 3 hours. The reaction mass is then cooled to room temperature, quenched with water and the non-aqueous portion washed with a 3 percent aqueous sodium carbonate solution and then with water. The so-washed organic solution is then stripped of solvent at reduced pressure to give a 99 percent yield (based on dimethylphosphinothioic chloride) of O-(3-methyl-4-chlorophenyl) dimethylphosphinothioate, a colorless oily liquid, which is soluble in acetone but insoluble in water.

*Analysis.*—Theory: 15.1% Cl. Found: 15.8% Cl.

Example XVI

To a suitable reaction vessel equipped with a thermometer, agitator, and reflux condenser is charged approximately 2.5 parts by weight (substantially 0.014 mol) of 3-chloro-4-nitrophenol, approximately 15 parts by weight of benzene, and approximately 1.5 parts by weight (substantially 0.015 mol) of triethylamine. Sufficient ethyl acetate is added to the charge to effect complete solution. To this solution is slowly added 1.8 parts by weight (substantially 0.014 mol) of dimethylphosphinothioic chloride. The mass is then refluxed at 70–80° C. for about 3 hours. The reaction mass is then cooled to room temperature, quenched with water and the non-aqueous portion washed with a 3 percent aqueous sodium carbonate solution and then with water. The so-washed organic solution is then stripped of solvent at reduced pressure to give a solid residue, which upon recrystallization from benzene yielded light tan crystals of O - (3 - chloro - 4 - nitrophenyl) dimethylphosphinothioate, M.P. 57.5–58.5° C.

*Analysis.*—Theory: 11.7% P, 13.4% Cl. Found: 11.3% P, 13.7% Cl.

Employing the above procedure but replacing dimethylphosphinothioic chloride with an equimolecular amount of diethylphosphinothioic chloride there is obtained O - (3 - chloro - 4 - nitrophenyl) diethylphosphinothioate which material is soluble in acetone but insoluble in water.

Example XVII

To a suitable reaction vessel equipped with a thermometer and agitator is charged at room temperature approximately 20.0 parts by weight (substantially 0.1 mol) of 2,4,5-trichlorophenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.10 mol) of dimethylphosphinothioic chloride. The reaction mixture is then heated at 70–80° C. for 3 hours. The reaction mass is then cooled to room temperature, quenched with water and the non-aqueous portion washed with a 3 percent aqueous sodium carbonate solution and then with water. The so-washed organic solution is then stripped of solvent at reduced pressure to give a 99 percent yield (based on dimethylphosphinothioic chloride) of O-(2,4,5-trichlorophenyl) dimethylphosphinothioate, a colorless liquid which solidified on standing to a white solid, which on recrystallization from ether gave white crystals melting at 73–75° C.

*Analysis.*—Theory: 10.7% P, 11.1% S, 36.8% Cl. Found: 9.7% P, 11.9% S, 36.3% Cl.

Employing the above procedure but replacing dimethylphosphinothioic chloride with an equimolecular amount of diethylphosphinothioic chloride there is obtained O-(2,4,5-trichlorophenyl) diethylphosphinothioate which product is soluble in acetone.

Example XVIII

To a suitable reaction vessel equipped with a thermometer and agitator is charged at room temperature approximately 15.6 parts by weight (substantially 0.10 mol) of 4-chloro-3,5-xylenol, approximately 150 parts by weight of benzene and sufficient ethyl acetate to provide a homogeneous solution. To this solution is added with agitation approximately 10.1 parts by weight (substantially 0.10 mol) of triethylamine and approximately 12.8 parts by weight (substantially 0.10 mol) of dimethylphosphinothioic chloride. The reaction mixture is then heated at 70–80° C. for 3 hours. The reaction mass is then cooled to room temperature, quenched with water and the non-aqueous portion washed with a 3 percent aqueous sodium carbonate solution and then with water. The so-washed organic solution is then stripped of solvent at reduced pressure to give a 94 percent yield (based on dimethylphosphinothioic chloride) of O-(3,5-dimethyl-4-chlorophenyl) dimethylphosphinothioate, a white crystalline solid, which on recrystallization from ether melts at 62–63° C.

*Analysis.*—Theory: 12.0% P. Found: 11.6% P.

Example XIX

To a suitable reaction vessel equipped with a thermometer and agitator is charged at room temperature approximately 29.7 parts by weight (substantially 0.1 mol) of 2,6-dibromo-4-nitrophenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.10 mol) of dimethylphosphinothioic chloride. The reaction mixture is then heated at 70–80° C. for 3 hours. The reaction mass is then cooled to room temperature, quenched with water and the non-aqueous portion washed with a 3 percent aqueous sodium carbonate solution and then with water. The so-washed organic solution is then stripped of solvent at reduced pressure to give a 62 percent yield (based on dimethylphosphinothioic chloride) of O-(2,6-dibromo-4-nitrophenyl) dimethylphosphinothioate, a yellow solid which melted above 195° C. and which is soluble in benzene.

*Analysis.*—Theory: 8.0% P. Found: 7.8% P.

Employing the above procedure but replacing dimethylphosphinothioic chloride with an equimolecular amount of diethylphosphinothioic chloride there is obtained O-(2,6-dibromo-4-nitrophenyl) diethylphosphinothioate which is soluble in benzene.

Example XX

To a suitable reaction vessel equipped with a thermometer and agitator is charged at room temperature approximately 15.0 parts by weight (substantially 0.10 mol) of 4-tert.-butylphenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.1 mol) of dimethylphosphinothioic chloride. The reaction mixture is then heated at 70–80° C. for 3 hours. The reaction mass is then cooled to room temperature, quenched with water and the non-aqueous portion washed first with a 3 percent aqueous sodium carbonate solution and then with water. The so-washed organic solution is then stripped of solvent at reduced pressure to give a 97.5 percent yield (based on dimethylphosphinothioic chloride) of O-(4-tert.-butylphenyl) dimethylphosphinothioate, a colorless crystalline solid which upon recrystallizing from hexane gave a melting point of 59–61° C.

*Analysis.*—Theory: 12.8% P, 13.2% S. Found: 12.3% P, 14.0% S.

In the process of making the compounds of this invention any inert organic liquid or mixture of inert organic liquids can be employed provided at least one of the reactants is soluble therein. The methods by which the phenyl dialkylphosphinothioates of this invention are isolated will vary slightly with the reactants employed and the product produced. Further purification by selective solvent extraction or by absorptive agents such as activated carbon, or clays, can precede the removal of the inert organic liquid or solvent. Additionally an inert organic solvent can be added to and in the purification by adsorptive agents. However, the product is generally satisfactory for pesticidal purposes without further purification.

The O-aryl dialkylphosphinothioates of this invention were found to be outstanding pre-emergent herbicides. Each one of the following itemized compounds, O-(2-chloro-4-nitrophenyl) dimethylphosphinothioate
O-(3-trifluoromethyl-4-nitrophenyl) dimethylphosphinothioate
O-(3,5-dimethyl-4-chlorophenyl) dimethylphosphinothioate
O-(4-methoxyphenyl) dimethylphosphinothioate
O-(3-methyl-4-chlorophenyl) dimethylphosphinothioate
O-(4-bromophenyl) dimethylphosphinothioate
O-(4-tert.-butylphenyl) dimethylphosphinothioate
O-(2,4-dichlorophenyl) dimethylphosphinothioate
O-(3,5-dimethylphenyl) dimethylphosphinothioate was dissolved in acetone, the respective solutions were emulsified in water (the emulsifier being a water-soluble mixture of an alkylbenzene sulfonate anionic emulsifier and an alkylated phenyl polyether alcohol non-ionic emulsifier), and the respective aqueous emulsions applied in spray form at the rate of 25 pounds of the respective dimethylphosphinothioates per acre to soil seeded with a wide variety of grasses and broad-leaf plants. After ten days in the greenhouse under ordinary conditions of sunlight and watering, all of the above-itemized dialkylphosphinothioates displayed very pronounced to complete suppression of rye grass, sugar beet, foxtail, crabgrass, pigweed, wild buckwheat and tomato. Of the above evaluated compounds O-(3,5-dimethylphenyl) dimethylphosphinothioate exhibited highly desirable pre-emergent inhibition of the growth of a wide variety of grasses and broad-leaf plants upon supplying to the plant growing medium a quantity thereof at least sufficient to inhibit the pre-emergent growth of plants from seeds contained in the plant growing medium.

Although the phosphorus containing compounds of this invention are useful per se in pre-emergently controlling a wide variety of noxious vegetation, it is preferable that they be supplied in a dispersed form in a suitable extending agent.

In the instant specification and appended claims it is to be understood that the term "dispersed" is used in its widest possible sense. When it is said that the O-aryl dialkylphosphinothioates of this invention are dispersed, it means that particles of the O-aryl dialkylphosphinothioates of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g., pellets, granules, powders, or dusts. The term "dispersed" also includes mixtures which are suitable for use as aerosols including solutions, suspensions, or emulsions of the phosphorus-containing compounds of this invention in a carrier such as dichlorodifluoromethane and like fluorochloroalkanes which boil below room temperature at atmospheric pressures.

In the instant specification and appended claims it is to be understood that the expression "extending agent" includes any and all of those substances in which the O-aryl dialkylphosphinothioates of this invention are dispersed. It includes, therefore, the solvents of a true solution, the liquid phase of suspensions, emulsions or aerosols, the semi-solid carrier of ointments and the solid phase of particulate solids, e.g., pellets, granules, dusts and powders.

The exact concentration of the O-aryl dialkylphosphinothioates of this invention employed can vary considerably provided the required dosage (i.e., pre-emergent growth inhibiting amount) thereof is supplied. When the extending agent is a liquid or a mixture of liquids (e.g., as in solutions, suspensions, emulsions or aerosols), the concentration of the O-aryl dialkylphosphinothioate employed to supply the desired dosage generally will be in the range of 0.001 to 50 percent by weight. When the extending agent is a semi-solid or solid, the concentration of the O-aryl dialkylphosphinothioate employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared spray or particulate solid. In such a concentrate composition, the O-aryl dialkylphosphinothioate generally will be present in a concentration of 5 to 95 percent by weight, the residue being any one or more of the well-known pre-emergent inhibiting adjuvants, such as the various surface-active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions or emulsions of the phosphorus-containing compounds of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g., those boiling almost entirely under 400° F. at atmospheric pressure and having a flash point above about 80° F., particularly kerosene), mineral oils having an unsulfonatable residue above about 80 percent and preferably above about 90 percent. The hydrocarbon liquids are preferred. Others such as the low molecular weight aliphatic hydrocarbons, e.g., dipentene, diisobutylene, propylene trimer, and the like, or suitable polar organic liquids such as the aliphatic ethers and the aliphatic ketones containing not more than about 10 carbon atoms as exemplified by acetone, methylethyl ketone, diisobutyl ketone, dioxane, isopropyl ether, and the like, can be employed. In certain instances, it is advantageous to employ a mixture of organic liquids as the extending agent.

The phosphorus-containing compounds of this invention are preferably used in the form of emulsions or suspensions. Emulsions or suspensions are prepared by dispersing the phosphorus-containing compound of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). These surfactants include the well-known capillary-active substances which may be anion-active (or anionic), cation-active (or cationic), or non-ionizing (or non-ionic) which are described in detail in volume I and II of Schwartz, Perry and Berch's "Surface Active Agents and Detergents" (1958, Interscience Publishers, Inc., New York) and also in the November 1947, issue of Chemical Industries (pages 811–824) in an article entitled "Synthetic Detergents" by John W. McCutcheon and also in the July, August, September and October 1952, issues of Soap and Sanitary Chemicals under the title "Synthetic Detergents." The disclosures of these articles with respect to surfactants, i.e., the anion-active, cation-active and non-ionizing capillary active substances, are incorporated in this specification by reference in order to avoid unnecessary enlargement of this specification. The preferred surfactants are the water-soluble anionic surface-active agents and the water-soluble non-ionic surface-active agents set forth in U.S. 2,846,398 (issued August 5, 1958). In general it is preferred that a mixture of water-soluble anionic and water-soluble non-ionic surfactants be employed.

The phosphorus-containing organic compounds of this invention can be dispersed by suitable methods (e.g., tumbling or grinding) in solid extending agents either of organic or inorganic nature and supplied to the pest environment in particulate form. Such solid materials include, for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include, for example, such materials of organic nature as powdered cork, powdered wood, and powdered walnut shells. The preferred solid carriers are the adsorbent clays, e.g., bentonite. These mixtures can be used for pre-emergent growth control purposes in the dry form or, by addition of water-soluble surfactants or wetting agents the dry particulate solids can be rendered wettable by water so as to obtain stable aqueous dispersions or suspensions suitable for use as sprays.

For special purposes the phosphorus-containing compounds of this invention can be dispersed in a semi-solid extending agent such as petrolatum or soap (e.g., sodium stearate or oleate or palmitate or mixtures thereof) with or without the aid of solubility promoters and/or surfactants or dispersing agents.

In all of the forms described above the dispersions can be provided ready for use in pre-emergent control purposes or they can be provided in a concentrated form suitable for mixing with or dispersing in other extending agents. As illustrative of a particularly useful concentrate is an intimate mixture of a phosphorus-containing organic compound of this invention, particularly the O-aryl dimethylphosphinothioates of the structure

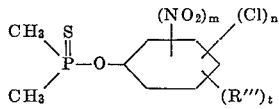

wherein R''' is lower alkyl; wherein $m$ is a number from 0 to 2, inclusive; wherein $n$ is a number from 0 to 3, inclusive; wherein $t$ is a number from 0 to 2, inclusive; and wherein the sum total of $m$, $n$ and $t$ is a number from 0 to 3, inclusive, with a water-soluble surfactant which lowers the surface tension of water in the weight proportions of 0.1 to 15 parts of surfactant with sufficient of the phosphorus-containing organic compound of this invention to make 100 parts by weight. Such a concentrate is particularly adapted to be made into a spray for pre-emergently combatting various forms of noxious vegetation by the addition of water thereto. As illustrative of such a concentrate is an intimate mixture of 95 parts by weight of O-(3,5-dimethylphenyl) dimethylphosphinothioate and 5 parts by weight of a water-soluble non-ionic surfactant such as the polyoxyethylene derivative of sorbitan monolaurate.

Another useful concentrate adapted to be made into a spray for pre-emergently combatting noxious vegetation is a solution (preferably as concentrated as possible) of a phosphorus-containing organic compound of this invention (particularly the above-mentioned O-aryl dimethylphosphinothioates) in an organic solvent therefor. The said liquid concentrate preferably contains dissolved therein a minor amount (e.g., 0.5 to 10 percent by weight of the weight of the new pre-emergent agent) of a surfactant (or emulsifying agent), which surfactant is also water-soluble. As illustrative of such a concentrate is a solution of O-(3,5-dimethylphenyl) dimethylphosphinothioate in benzene which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkylaryl sulfonates, such as sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of sorbitan.

In all of the various dispersions described hereinbefore for pre-emergent growth inhibiting purposes, the active ingredient can be one or more of the compounds of this invention. The compounds of this invention can also be advantageously employed in combination with other pesticides, including, for example, insecticides, acaricides, fungicides, and the like, as well as nematocides and bactericides commercially available. In this manner it is possible to obtain mixtures which are effective against a wide variety of pests. The compounds of this invention are characterized by relatively low mammalian toxicity and physical characteristics that make them easy to use per se or to formulate. In general the new pre-emergent inhibiting agents are substantially odorless.

In pre-emergently controlling or combatting noxious vegetation growth the O-aryl dialkylphosphinothioates of this invention either per se or compositions comprising same are supplied to the noxious vegetation's environment in a pre-emergent growth inhibiting amount. This can be done by dispersing the new pre-emergent growth inhibiting agent or formulation comprising same in, on or over an infested environment or in, on or over an environment the pests frequent, e.g., agricultural soil or other growth media or other media infested with the noxious vegetation, in any conventional fashion which permits contact between the noxious vegetation and an O-aryl dialkylphosphinothioate of this invention. Such dispersing can be brought about by applying the new agents per se or sprays or particulate solid compositions containing same to the surface of an agricultural soil or other growth media by any of the conventional methods, e.g., power dusters, broom and hand sprayers, and spray dusters. Also for sub-surface application such dispersing can be carried out by simply mixing the new agent per se or spray or particulate solid compositions comprising same with the infested environment or by employing a liquid carrier for the new agent to accomplish subsurface penetration and impregnation thereof therein.

While this invention has been described with respect to certain embodiments, it is to be understood that it is not so limited and that variations and modifications thereof obvious to those skilled in the art can be made without departing from the spirit or scope thereof.

What is claimed is:

1. The method of pre-emergently inhibiting the growth of plants which comprises treating the plant growing medium with a quantity at least sufficient to inhibit the pre-emergent growth of plants from seeds contained in the plant growing medium of O-(3,5-dimethylphenyl)dimethylphosphinothioate.

2. The method of pre-emergently inhibiting the growth of plants which comprises treating the plant growing medium with a quantity at least sufficient to inhibit the pre-emergent growth of plants from seeds contained in the plant growing medium of at least one-phosphorus-containing compound of the structure

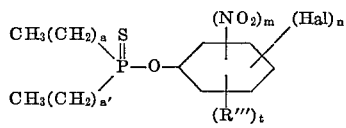

wherein $a$ and $a'$ are numbers from 0 to 1, inclusive;
wherein Hal is a halogen atom having an atomic number not higher than 35;
wherein R''' is selected form the group consisting of lower alkyl and halogen-substituted lower alkyl, said halogen substituent being a halogen atom having an atomic number not higher than 35, the sum total of halogen substituents being not in excess of four;
wherein $m$ is a number from 0 to 2, inclusive;
wherein $n$ is a number from 0 to 3, inclusive;
wherein $t$ is a number from 0 to 2, inclusive;
and wherein the sum total of $m$, $n$ and $t$ is a number from 0 to 3, inclusive.

3. The method of pre-emergently inhibiting the growth of plants which comprises treating the plant growing medium with a quantity at least sufficient to inhibit the pre-emergent growth of plants from seeds contained in the plant growing medium of at least one phosphorus-containing compound of the structure

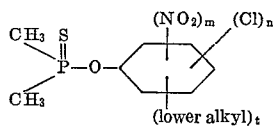

wherein $m$ is a number from 0 to 2, inclusive;
wherein $n$ is a number from 0 to 3, inclusive;
wherein $t$ is a number from 0 to 2, inclusive;
and wherein the sum total of $m$, $n$ and $t$ is a number from 0 to 3, inclusive.

4. The method of pre-emergently inhibiting the growth of plants which comprises treating the plant growing medium with a quantity at least sufficient to inhibit the pre-emergent growth of plants from seeds contained in the plant growing medium of O-(2-chloro-4-nitrophenyl) dimethylphosphinothioate.

5. The method of pre-emergently inhibiting the growth of plants which comprises treating the plant growing medium with a quantity at least sufficient to inhibit the pre-emergent growth of plants from seeds contained in the plant growing medium of (2,4-dichlorophenyl) dimethylphosphinothioate.

6. The method of pre-emergently inhibiting the growth of plants which comprises treating the plant growing medium with a quantity at least sufficient to inhibit the pre-emergent growth of plants from seeds contained in the plant growing medium of (3-methyl-4-chlorophenyl) dimethylphosphinothioate.

No references cited.

LEWIS GOTTS, *Primary Examiner.*